(12) United States Patent
Ohnishi

(10) Patent No.: US 6,715,366 B2
(45) Date of Patent: Apr. 6, 2004

(54) CLAMP-ON ULTRASONIC FLOWMETER

(76) Inventor: Kazumasa Ohnishi, 121-35, Hanazonohigashi 2-chome, Nagaoki-shi, Niigata 940-0846 (JP)

( * ) Notice: Subject to any disclaimer, the term of this patent is extended or adjusted under 35 U.S.C. 154(b) by 0 days.

(21) Appl. No.: 10/041,502

(22) Filed: Jan. 10, 2002

(65) Prior Publication Data

US 2002/0108450 A1 Aug. 15, 2002

(30) Foreign Application Priority Data

Feb. 14, 2001 (JP) .................................. 2001-079405
Sep. 18, 2001 (JP) .................................. 2001-283136

(51) Int. Cl.$^7$ ................................................ G01F 1/66
(52) U.S. Cl. ........................................... 73/861.27
(58) Field of Search .................... 73/861.27, 861.26, 73/861.06, 861.25, 861.18, 861.05

(56) References Cited

U.S. PATENT DOCUMENTS

| | | | | |
|---|---|---|---|---|
| 4,598,593 A | * | 7/1986 | Sheen et al. ............. 73/861.04 |
| 5,214,343 A | * | 5/1993 | Baumoel ................... 310/334 |
| 5,437,194 A | * | 8/1995 | Lynnworth ............... 73/861.27 |
| 5,856,622 A | * | 1/1999 | Yamamoto et al. ...... 73/861.28 |
| 6,293,156 B1 | * | 9/2001 | Shen et al. ............. 73/861.26 |

* cited by examiner

*Primary Examiner*—Edward Lefkowitz
*Assistant Examiner*—Jewel V. Thompson
(74) *Attorney, Agent, or Firm*—Nixon Peabody LLP; Jeffery L. Costellia

(57) ABSTRACT

A clamp-on ultrasonic flowmeter has a pair of ultrasonic transmitting-receiving devices. Each device is composed of a ultrasonic propagating element in the form of wedge having a bottom surface and a slanting surface extending from one edge of the bottom surface at an acute angle, and a ultrasonic transducer attached on the slanting surface. The ultrasonic propagating element is composed of a first ultrasonic propagating member having on its bottom surface a number of planes aligned in parallel with the slanting surface on which the ultrasonic transducer is attached and a second ultrasonic propagating member of elastic or plastic material, so as to propagate ultrasonic wave emitted by the ultrasonic transducer onto the bottom surface of the ultrasonic propagating element at an angle perpendicular to the slanting surface.

31 Claims, 7 Drawing Sheets

CLAMP-ON ULTRASONIC FLOWMETER

FIELD OF THE INVENTION

The invention relates to a clamp-on ultrasonic flow-meter, a flow rate-measuring structure, and a ultrasonic transmitting-receiving device.

BACKGROUND OF THE INVENTION

The clamp-on ultrasonic flowmeter is attached to a outer surface of a pipe in which a fluid flows, for measuring from outside of the pipe a volume of the fluid flowing inside of the pipe. The clamp-on ultrasonic flowmeters are generally classified into two types. One utilizes a difference of propagating rates, and another utilizes the Doppler effect.

In the mode utilizing a difference of propagating rates, a pair of ultrasonic waves are propagated under such condition that one ultrasonic wave is propagated downstream to cross the stream of fluid while another ultrasonic wave is propagated upstream to cross the stream of fluid. Then, the time required for propagating the downstream ultrasonic wave between the predetermined distance and the time required for propagating the upstream ultrasonic wave between the same distance are compared to determine the flow rate.

In the mode utilizing the Doppler effect, the flow rate is determined by measuring a rate of particle or babble flowing with the fluid, under assumption that the particle or babble moves at a rate equal to that of the moving fluid. The moving rate of the particle or babble can be determined, by detecting variation of ultrasonic frequency from that of ultrasonic wave applied to the moving particle or babble to that of ultrasonic wave reflected to the moving particle or babble.

A representative constitution of a known clamp-on ultrasonic flowmeter is illustrated in FIG. 9 in the form of a sectional view. The clamp-on ultrasonic flowmeter of FIG. 9 utilizes a difference of propagating rates of ultrasonic wave. The clamp-on ultrasonic flowmeter is composed of a pair of ultrasonic transmitting-receiving devices 1a, 1b. The ultrasonic transmitting-receiving device 1a is composed of a ultrasonic transducer 2a and a ultrasonic propagating element in the form of wedge 3a. The ultrasonic propagating element 3a has a bottom surface 4a and a slanting surface 5a extending from one edge of the bottom surface 4a at an acute angle. The ultrasonic transducer 2a is attached on the slanting surface 5a. The ultrasonic transducer 2a has an electrode (not shown) and a lead line (not shown) on the side facing the propagating element 3a and on another side. The combination of the electrode and lead line serves to apply electric voltage to the transducer 2a. In the same way, the ultrasonic transmitting-receiving device 1b is composed of a ultrasonic propagating element 3b having a slanting surface 5b on which the ultrasonic transducer 2b is attached.

Each of the ultrasonic transducers 2a, 2b transmits ultrasonic wave to the ultrasonic propagating element when an electric voltage is applied thereto, while it produces an electric voltage when it receives ultrasonic wave. Accordingly, the ultrasonic transmitting-receiving device 1a, 1b equipped with a ultrasonic transducer functions as a transmitter and a receiver. The ultrasonic transmitting-receiving devices 1a, 1b are provided on a pipe 6 in such manner that the ultrasonic waves transmitted by the devices 1a, 1b propagate across the fluid 7 which flows inside of the pipe in the direction indicated by arrow 8, that is, on the route 9 (indicated by a dotted line) in the directions indicated in FIG. 9 by arrows 9a, 9b.

The flow rate of the fluid 7 flowing inside of the pipe 6 is determined by the following method. First, a voltage pulse is applied to the ultrasonic transducer 2a of the ultrasonic transmitting-receiving device 1a, so as to transmit a ultrasonic wave. The ultrasonic wave propagates in the ultrasonic propagating element 3a, a wall of pipe 6, fluid 7, a wall of pipe 6 on the opposite side, and ultrasonic propagating element 3b on the route indicated in FIG. 9 by the dotted line 9. Subsequently, the ultrasonic wave is received by the ultrasonic transducer 2b of the ultrasonic transmitting-receiving device 1b, to output a voltage signal. A period of time ($T_1$) from the time when the ultrasonic wave is transmitted by the ultrasonic transmitting-receiving device 1a to the time when the ultrasonic wave is received by the ultrasonic transmitting-receiving device 1b is detected. Subsequently, a voltage pulse is applied to the ultrasonic transducer 2b of the ultrasonic transmitting-receiving device 1b, so as to transmit a ultrasonic wave. The ultrasonic wave is then propagate on the same route, but in the opposite direction, and the ultrasonic transducer 2a of the ultrasonic transmitting-receiving device 1a receives the propagated ultrasonic wave. A period of time ($T_2$) from the time when the ultrasonic wave is transmitted by the ultrasonic transmitting-receiving device 1b to the time when the ultrasonic wave is received by the ultrasonic transmitting-receiving device 1a is detected.

The period of time ($T_1$) required for the propagation of ultrasonic wave from the device 1a to the device 1b along the arrow 9a differs from the period of time ($T_2$) required for the propagation of ultrasonic wave from the device 1b to the device 1a along the arrow 9b. The period of time ($T_1$) is shorter than a period of time required for propagating ultrasonic wave in still water because the ultrasonic wave from the device 1a to the device 1b is propagated at an increased rate by the aid of the flowing fluid, while the period of time ($T_2$) is longer than a period of time required for propagating ultrasonic wave in still water because the ultrasonic wave is propagated from the device 1b to the device 1a against the stream of the fluid. Thus, the difference of the propagation period ($T_2$–$T_1$) is relative to the rate of movement of the flowing fluid 7. Therefore, the rate of movement of the flowing fluid is calculated from the difference of propagation period. The flow rate of the fluid 7 is then determined from the difference of propagation period and the sectional area of the inside of the pipe 6.

Thus, the clamp-on ultrasonic flowmeter is advantageous in that it can determine the flow rate with no direct contact with the flowing fluid. In order to employ the clamp-on ultrasonic flowmeter more advantageously, however, a study should be made on the clamp-on ultrasonic flowmeter for increasing the measuring sensitivity.

One main point for increasing the measuring sensitivity of the clamp-on ultrasonic flowmeter resides in prolongation of the ultrasonic wave-propagating passage in the fluid passing within the pipe (or tube). If the ultrasonic wave-propagating passage in the passing fluid is prolonged, the flow rate can be detected using the long propagating passage, and therefore the sensitivity of the flowmeter increases.

The ultrasonic wave transmitted by a ultrasonic transducer propagates to the fluid through the ultrasonic propagating element and the pipe wall. The ultrasonic wave is refracted first on the interface between the ultrasonic propagating element and the pipe wall based on the ratio of sonic propagating rate between both materials, according to the Snell's Law, and second on the interface between the pipe wall and the fluid in the same way.

Since the sonic propagating rate of the pipe wall and that of the passing fluid are predetermined, it is effective for the prolongation of ultrasonic wave passage in the passing fluid to adjust the sonic propagating rate of the ultrasonic propagating element in the wedge form to be essentially equivalent to that of the pipe wall and further to impinge the ultrasonic wave onto the pipe wall at a large angle of incidence.

Accordingly, it appears natural to make the ultrasonic propagating element using the same material as that of the pipe wall. For instance, if the pipe wall is made of fluororesin, it is assumed that the ultrasonic propagating element is favorably made of fluororesin. However, the use of the pipe wall material as the material of the ultrasonic propagating element is not necessarily favorably employable, because the ultrasonic wave is apt to attenuate noticeably in most of the wall materials. Particularly, the ultrasonic wave attenuates markedly in the fluororesin.

SUMMARY OF THE INVENTION

Accordingly, the present invention has an object to provide a clamp-on ultrasonic flowmeter giving an improved high sensitivity.

The invention has another object to provide a flow rate-measuring structure giving an improved high sensitivity.

The invention has a further object to provide a new ultrasonic transmitting-receiving device.

The present inventor has succeeded in providing a clamp-on ultrasonic flowmeter which shows an improved high sensitivity by constituting the ultrasonic propagating element of the ultrasonic transmitting-receiving device from a combination of plural different materials.

The present invention resides in a clamp-on ultrasonic flowmeter comprising a pair of ultrasonic transmitting-receiving devices, each comprising a ultrasonic propagating element in the form of wedge having a bottom surface and a slanting surface extending from one edge of the bottom surface at an acute angle, and a ultrasonic transducer attached on the slanting surface, wherein the ultrasonic propagating element comprises a first ultrasonic propagating member having on a bottom surface thereof a plurality of planes aligned in parallel with the slanting surface on which the ultrasonic transducer is attached and a second ultrasonic propagating member of elastic or plastic material, so as to propagate ultrasonic wave emitted by the ultrasonic transducer onto the bottom surface of the ultrasonic propagating element at an angle perpendicular to the slanting surface.

The invention also resides in a flow rate-measuring structure comprising a pipe in which a fluid flows and a pair of ultrasonic transmitting-receiving devices arranged on the pipe on an outer surface thereof, each transmitting-receiving device comprising a ultrasonic propagating element in the form of wedge having a bottom surface and a slanting surface extending from one edge of the bottom surface at an acute angle, and a ultrasonic transducer provided on the slanting surface, wherein the ultrasonic propagating element comprises a first ultrasonic propagating member having on a bottom surface thereof a plurality of planes aligned in parallel with the slanting surface on which the ultrasonic transducer is attached and a second ultrasonic propagating member of elastic or plastic material, so as to propagate ultrasonic wave emitted by the ultrasonic transducer onto the bottom surface of the ultrasonic propagating element at an angle perpendicular to the slanting surface.

The invention further resides in a ultrasonic transmitting-receiving device comprising a ultrasonic propagating element in the form of wedge having a bottom surface and a slanting surface extending from one edge of the bottom surface at an acute angle, and a ultrasonic transducer attached on the slanting surface, wherein the ultrasonic propagating element comprises a first ultrasonic propagating member having on a bottom surface thereof a plurality of planes aligned in parallel with the slanting surface on which the ultrasonic transducer is attached and a second ultrasonic propagating member of elastic or plastic material, so as to propagate ultrasonic wave emitted by the ultrasonic transducer onto the bottom surface of the ultrasonic propagating element at an angle perpendicular to the slanting surface.

In the invention, the following embodiments are preferred.

(1) The first ultrasonic propagating member comprises a plurality of sheet units in which each sheet unit is composed of plural high modulus fibers aligned in parallel in resinous material.

(2) The sheet units of the first ultrasonic propagating member are produced under the condition that the high modulus fibers in one sheet unit are arranged to make a right angle with the high modulus fibers in an adjoining sheet unit.

(3) The high modulus fiber has a tensile modulus of higher than 50 GPa.

(4) The high modulus fiber is carbon fiber.

(5) The second ultrasonic propagating member has a convex surface on the bottom surface.

(6) The second ultrasonic propagating member has a rate of sonic wave propagation in the range of 1,000 to 2,000 m/sec.

(7) The second ultrasonic propagating member has a rate of sonic wave propagation higher than that of the first ultrasonic propagating member.

(8) The second ultrasonic propagating member is made of polymeric gel, typically, polyurethane gel.

(9) The ultrasonic transmitting-receiving devices are linearly arranged in a long case having opening on a bottom thereof under the condition that the slanting surfaces on each of which the ultrasonic transducer is attached do not face each other.

(10) The pair of the ultrasonic transmitting-receiving devices are arranged under the condition that each of the transmitting-receiving device is able to move on the opening to change a distance between the transmitting-receiving devices.

(11) The pipe is made of resinous material having a rate of sonic propagation of at least 2,000 m/sec., such as fluororesin.

DETAILED DESCRIPTION OF THE INVENTION

The present invention is further described by referring to the figures given in the attached drawings.

Figure 1:
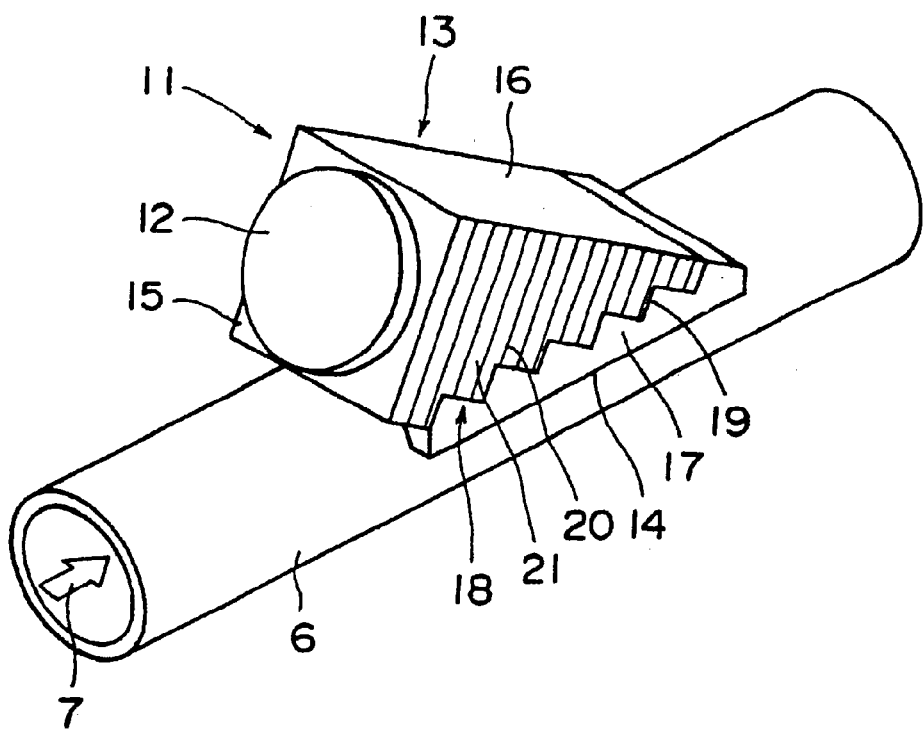
FIG. 1 is a schematic view of one ultrasonic transmitting-receiving device according to the invention.

FIG. 1 is a schematic view of one ultrasonic transmitting-receiving device according to the invention. In FIG. 1, a ultrasonic transmitting-receiving device 11 is composed of a ultrasonic transducer 12 and a ultrasonic propagating element in a wedge form 13. The ultrasonic propagating element 13 has a bottom surface 14 and a slanting surface 15 extending from one edge of the bottom surface 14 at an acute angle. The ultrasonic transducer 12 is attached onto the slanting surface 15. The ultrasonic transducer 12 has an electrode (not shown) and a lead line (not shown) on the side facing the propagating element as well as on another side. The combination of the electrode and lead line serves to apply electric voltage to the transducer 12.

The ultrasonic propagating element 13 is composed of a first ultrasonic propagating member 16 and a second ultrasonic propagating member 17 attached to the bottom surface 18 of the first member 16, under the condition that the ultrasonic wave emitted by the ultrasonic transducer 23 is propagated onto the bottom surface 14 of the ultrasonic propagating element 13 at an angle perpendicular to the slanting surface 15.

The first member 16 has on its bottom surface 18 a plurality of planes 19 aligned in parallel with the slanting surface 15 on which the ultrasonic transducer 12 is attached. The second ultrasonic propagating member 17 is made of elastic or plastic material.

In the ultrasonic propagating element 13 of FIG. 1, ultrasonic wave transmitted by the ultrasonic transducer 12 advances through the first propagating member 16 toward its bottom surface 18 having a plurality of planes 19. Since the plural planes 19 are aligned in parallel with the slanting surface 15, the ultrasonic wave impinges on the planes 19 perpendicularly. Accordingly, there occur essentially no refractions on the planes 19 which are present between the first propagating member 16 and the second propagating member 17. Further, since the ultrasonic wave impinges on the planes 19 perpendicularly, there occur little reflections of the ultrasonic wave on the planes 19, though there occur some reflections caused by difference of sonic impedance between the first propagating member and the second propagating member.

Accordingly, the material for the production of the first ultrasonic propagating member can be selected only in consideration of attenuation of ultrasonic wave in the material, irrespective of sonic propagating rate. This means that the first ultrasonic propagating member can be made of any material in which the attenuation of ultrasonic wave is low.

The second ultrasonic propagating member 17 is made of elastic or plastic material which shows a sonic propagating rate essentially equal or near to the sonic propagating rate of the material of pipe wall on which the ultrasonic transmitting-receiving device is to be attached. The second ultrasonic propagating member 17 also functions to bring the ultrasonic propagating element into close contact with the pipe surface.

The first ultrasonic propagating member 16 is preferably made of a plurality of sheet units in which each sheet unit is composed of plural high modulus fibers aligned in parallel in resinous material, as illustrated in FIG. 1. The use of these sheet units for the production of the first ultrasonic propagating member 16 is effective to more enhance the sensitivity of the flowmeter.

The high sensitivity of the flowmeter provided by making the ultrasonic transmitting-receiving device of fiber-reinforced resinous material can be explained as follows (1) The high modulus fibers aligned in parallel to each other on the slanting surface of the first ultrasonic propagating member (corresponding to the vibrating surface of the ultrasonic transducer) prohibit diffusion of ultrasonic wave along the vibrating surface of the ultrasonic transducer, while assist the ultrasonic wave to predominantly advance in the direction perpendicular to the vibrating surface of the ultrasonic transducer. Accordingly, the directivity of the ultrasonic wave transmitted by the ultrasonic transducer is enhanced, and the sensitivity of the flowmeter is improved.

(2) Generally, when ultrasonic wave (longitudinal wave) propagates within solid material, a portion of the ultrasonic wave is converted into a traverse wave. The first ultrasonic propagating member of fiber-reinforced resinous material contains, along the ultrasonic wave propagating route perpendicular to the slanting surface (corresponding to the vibrating surface of the ultrasonic transducer, resinous portions between the highly aligned high modulus fibers). A portion of the propagating ultrasonic wave may be converted into a traverse wave. However, the high modulus fibers around the resinous portions prohibit diffusion of the traverse wave generated in the resinous portions. In other words, the well aligned high modulus fibers keep the generated traverse wave from diffusing in the first propagating member.

There are no specific limitations on the direction of alignment of the high modulus fibers, so long as the fibers are aligned in parallel to the slanting surface 15 of the ultrasonic propagating element 13 (corresponding to the vibrating surface of the ultrasonic transducer 12).

Preferably, the first ultrasonic propagating member is produced by combining a plurality of sheets units in thickness direction in which plural high modulus fibers are aligned in parallel to each other are embedded in resinous material along the sheet plane.

The sheet units of the first ultrasonic propagating are preferably produced under the condition that the high modulus fibers in one sheet unit are arranged to make a right angle with the high modulus fibers in an adjoining sheet unit. A block of fiber-reinforced resinous material produced under the above-mentioned conditions is commercially available. Accordingly, the first ultrasonic propagating member can be produced by appropriately cutting the commercially available fiber-reinforced resinous material block.

The high modulus fiber preferably has a tensile modulus of higher than 50 GPa, more preferably 100 GPa or higher. Examples of the high modulus fibers include carbon fiber, silicon carbide fiber, polyamide fiber, and aramide fiber.

Examples of the resinous materials for the production of the fiber-reinforced resinous material include epoxy resin, polyamide resin, polyimide resin, polyetherether ketone (PEEK) resin, phenol resin, unsaturated polyester resin, polycarbonate resin, and polyamideimide resin. Preferred is epoxy resin.

Some information on the use of fiber-reinforced resinous material for flowmeter is given in Japanese Patent Provisional Publication H7-284198.

The second ultrasonic propagating member is elastic or plastic material. Examples of the elastic or plastic materials include metals such as ion and stainless steel, polymeric material such as vinyl chloride, fluororesin, epoxy resin and acryl resin, soft polymeric gels such as polyurethane gel, silicone gel and polyurethane elastomer, and viscous material such as grease. It is advantageous to produce the second ultrasonic propagating member using material which is used for the production of the pipe wall on which the ultrasonic transmitting-receiving device is attached. However, more preferred are soft polymeric gels such as polyurethane gel, silicone gel and polyurethane elastomer. Most preferred is polyurethane gel.

The second ultrasonic propagating member is preferably made of soft polymeric gel or grease having a rate of sonic propagation in the range of 1,000 to 2,000 m/sec.

The bottom surface 14 of the second ultrasonic propagating member 17 is preferably made to have a concave or U-shaped surface so as to have tight contact with the outer surface of the pipe 6. Thus produced second ultrasonic propagating member 17 serves further to fix the ultrasonic transmitting-receiving device 11 stably onto the outer surface of the pipe 6, and furthermore serves to easily adjust the position of the device 11 on the pipe wall 6.

If a space (containing air) is present between the ultrasonic propagating element 13 and the pipe 6, the ultrasonic wave is reflected on the interface between the propagating element and air. This is because the impedance of air is low, as compared with the that of the propagating element. Therefore, contact material (i.e., buffer materia) is preferably inserted between the ultrasonic propagating element and the pipe for removing the air from the space between the propagating element and the pipe surface. The second ultrasonic propagating member can serve as the contact material.

Otherwise, the contact material can be placed on the pipe surface by the steps of coating the contact material on the outer surface of the pipe and placing the ultrasonic transmitting-receiving device on the coated contact material under pressure.

Figure 2:
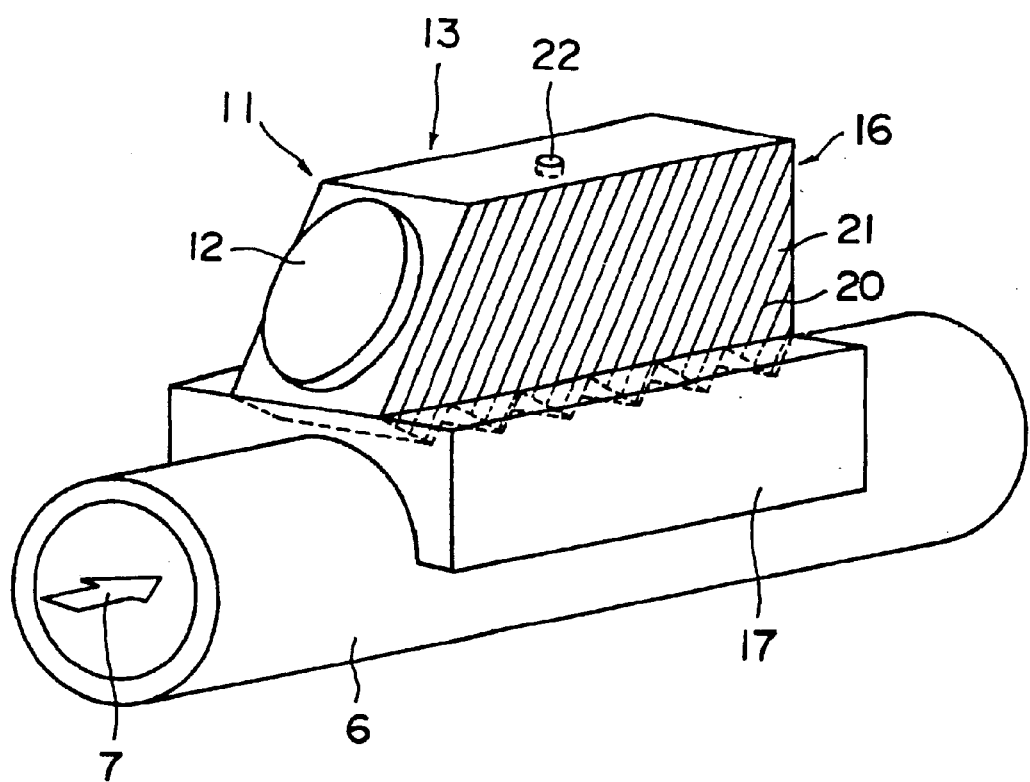
FIG. 2 is a schematic view of another ultrasonic transmitting-receiving device according to the invention.

The ultrasonic transmitting-receiving device of the invention is further explained by referring to FIG. 2 in which another embodiment of the ultrasonic transmitting-receiving device of the invention is schematically illustrated. The ultrasonic transmitting-receiving device 11 of FIG. 2 is the same as that of FIG. 1, except that the device has a different figure. So long as the function of propagating the ultrasonic wave in the direction perpendicular to the slanting surface on which the ultrasonic transducer is placed is concerned, the figure of the ultrasonic transmitting-receiving device of FIG. 1 is satisfactory. However, if the ultrasonic transmitting-receiving device has a upper plane surface, a bolt hole 19 for fixing the device to the pipe surface can be provided on the plane surface. A more detailed description on the fixation is set forth hereinafter.

Figure 3:
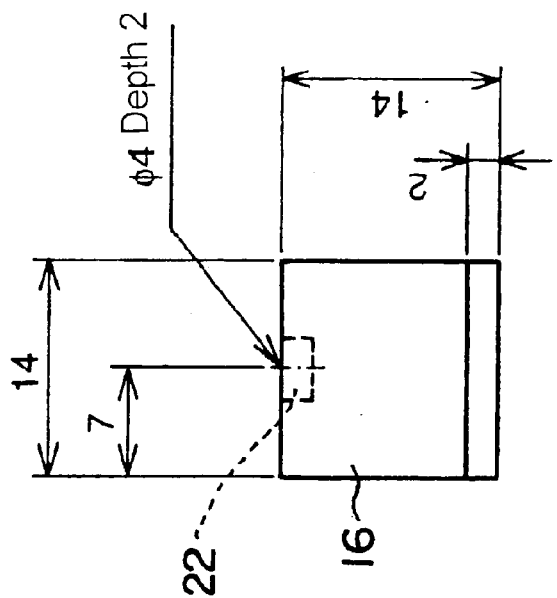
FIGS. 3-(a) and -(b) indicate representative sizes of the ultrasonic transmitting-receiving device of FIG. 2.
Figure 3:
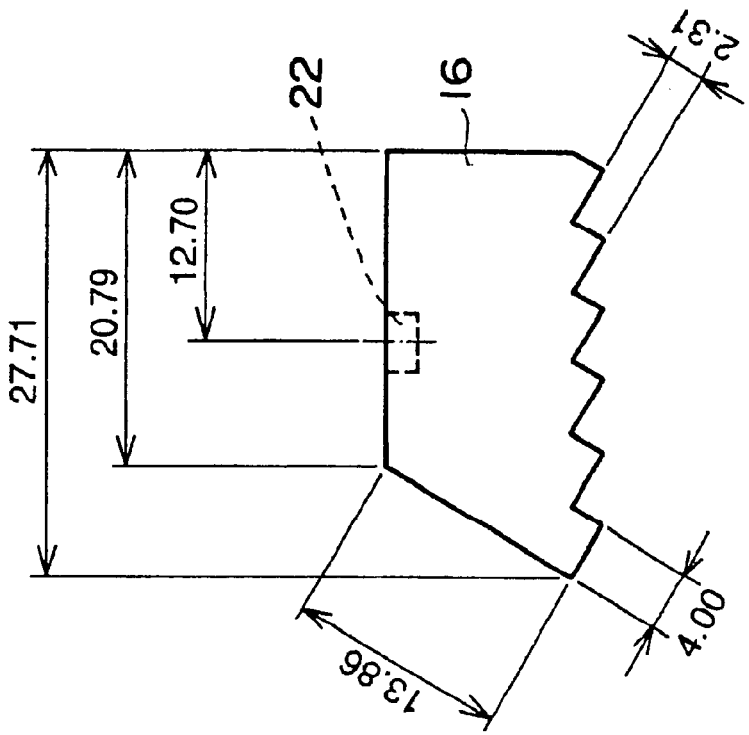

Typical sizes (in terms of mm) of the ultrasonic transmitting-receiving device in the wedge form 13 are given in FIG. 3. FIG. 3-(a) is a side view of the ultrasonic transmitting-receiving device 13, and FIG. 3-(b) is a rear view of the transmitting-receiving device 13.

As described hereinbefore, the clamp-on ultrasonic flowmeter is generally classified into that utilizing a difference of propagating rate and that utilizing Doppler effect. Further, there are clamp-on ultrasonic flowmeters of different types.

Details of the prior art clamp-on ultrasonic flowmeters are described in "Measurement of Flow Rate, A to B", Chapter 8 (Society of Japanese Measuring Device Industries, 1995).

Figure 4:
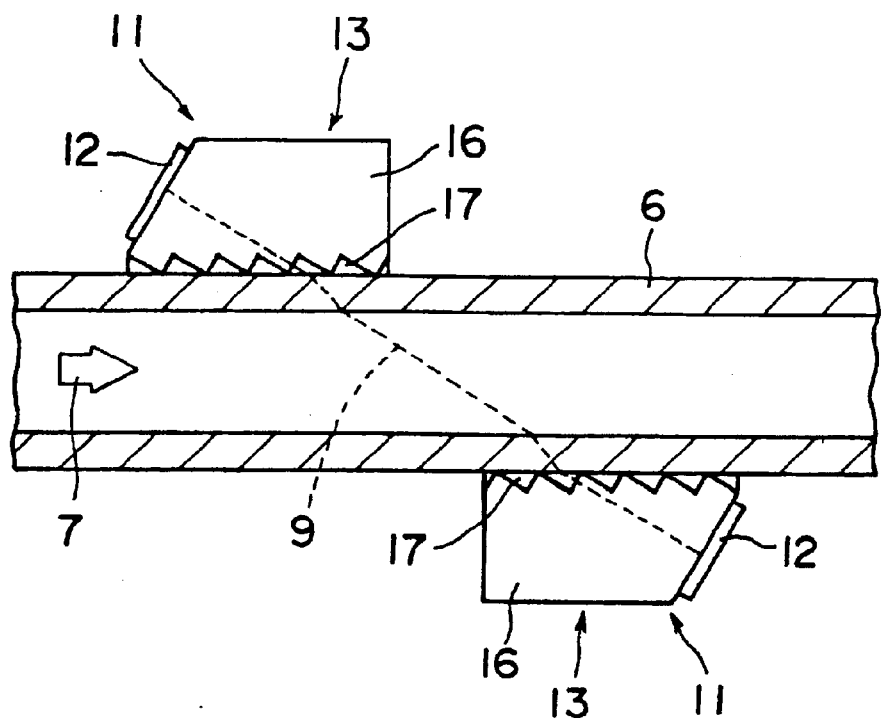
FIG. 4 shows a section of a clamp-on ultrasonic flowmeter which is formulated by a pair of the ultrasonic transmitting-receiving device of the invention in the Z-mode.
Figure 5:
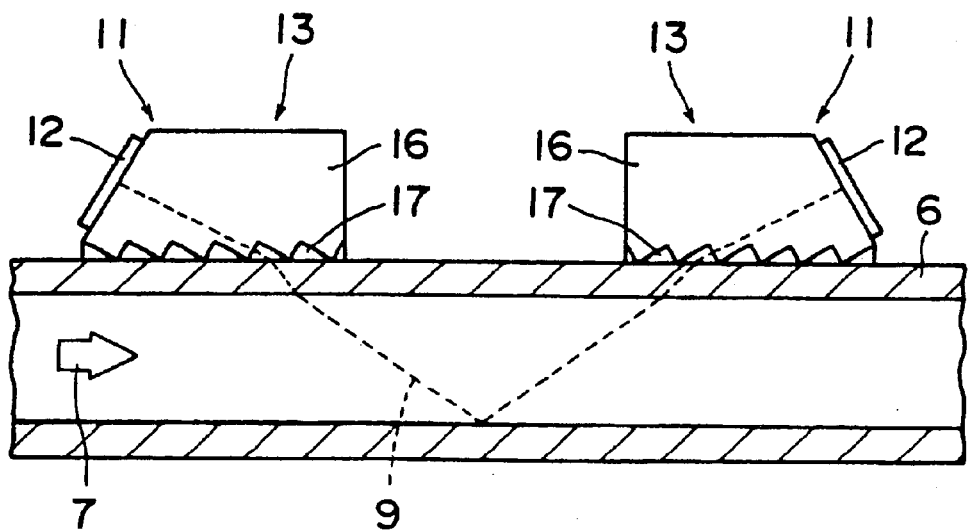
FIG. 5 shows a section of a clamp-on ultrasonic flowmeter which is formulated by a pair of the ultrasonic transmitting-receiving device of the invention in the V-mode.

The ultrasonic transmitting-receiving device can be arranged in a Z-mode or a V-mode to give a ultrasonic flowmeter. A representative arrangement of the Z-mode is illustrated in FIG. 4. A representative arrangement of the V-mode is illustrated in FIG. 5. The names of Z-mode and V-mode are given in view of the figures of propagating routes of the ultrasonic wave 9 in the passing fluid.

The V-mode is advantageous, because it gives a totally long passage (which gives a relatively high sensitivity), as compared with the total passage given by the Z-mode. Moreover, a pair of the ultrasonic transmitting-receiving devices are easily attached to the outer surface of the pipe 6 in the V-mode arrangement.

The clamp-on ultrasonic flowmeter of the invention is further described below in more detail.

Figure 6:
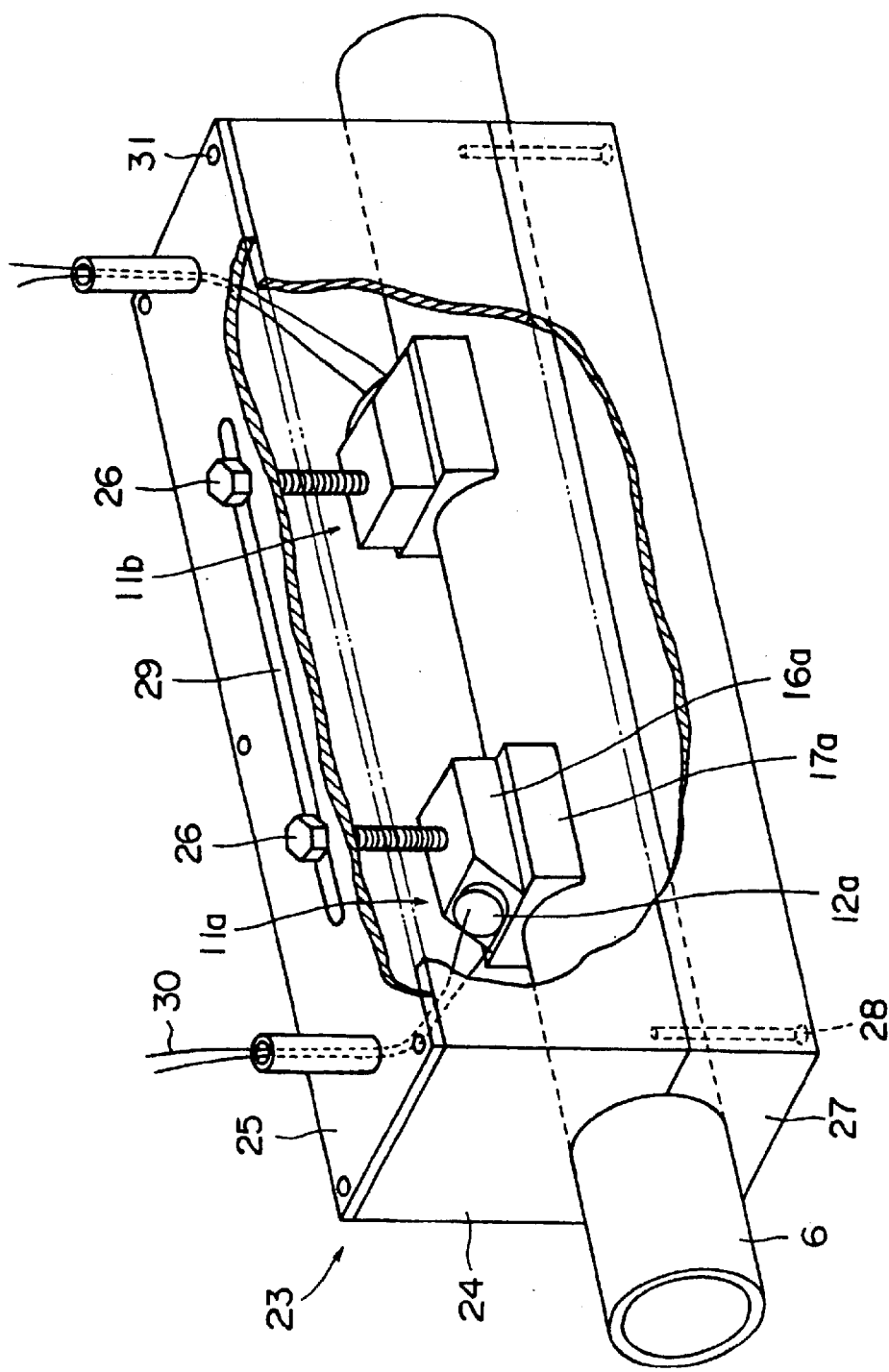
FIG. 6 is a partially cutaway schematic view of a clamp-on ultrasonic flowmeter according to the invention.

FIG. 6 is a partially cutaway schematic view of a clamp-on ultrasonic flowmeter according to the invention.

The clamp-on ultrasonic flowmeter of the invention practically comprises a pair of the ultrasonic transmitting-receiving devices of the invention and means for fixing the transmitting-receiving devices onto the pipe (or tube). For instance, a pair of the ultrasonic transmitting-receiving devices 11a, 11b are linearly arranged within a long case 23 having opening on its bottom and optionally on a cover plate 25 under the condition that the slanting surfaces on each of which the ultrasonic transducer is attached do not face each other, as illustrated in FIG. 6. The long case 23 comprises a casing body 24 and the cover plate 25. The cover plate 24 having an opening 31 is fixed to the casing body 21 by means of screws 28. An electric line 30 is connected to the ultrasonic transducer 12a.

If the sizes of the pipe (i.e., inner diameter and outer diameter) and nature of the pipe material are previously known, an appropriate distance between the ultrasonic transmitting-receiving devices 11a, 11b can be calculated separately. Accordingly, the devices 11a, 11b can be previously fixed in the long case at an appropriate space using the upper opening 29 and a pair of bolts 26. A clamp-on ultrasonic flowmeter comprising the long case 23 in which a pair of the ultrasonic transmitting-receiving devices are fixed at a predetermined space is easily set to various pipes of chemical plants or other pipe system.

The fixation of the flowmeter to a pipe is easily and reliably accomplished by placing the pipe 6 between the case 23 and a flowmeter-fixing aid 27 and then combining the case 23 and the fixing aid 27 by means of screws 28. The fixing method is not limitative. For instance, the case 23 can be fixed to the pipe 6 using a rubber band.

If the sizes of the pipe (i.e., inner diameter and outer diameter) and nature of the pipe material are not known, the distance between the ultrasonic transmitting-receiving devices should be adjusted and determined in situ for each pipe system. The long opening 29 of FIG. 6 is advantageously provided for such adjustment of the distances between the transmitting-receiving devices.

A rate of sonic wave propagation of the second ultrasonic propagating member to be attached onto a pipe wall preferably is in the range of 1,000 to 2,000 m/sec. For instance, the polyurethane gel has a rate of sonic wave propagation of approx. 1,400 m/sec., while grease has a rate of sonic wave propagation of approx. 1,500 m/sec. The fiber-reinforced resinous material preferably utilized for the first ultrasonic propagating member typically has a rate of approximately 3,000 m/sec., in the direction perpendicular to the longitudinal direction of the high modulus fibers.

Figure 10:
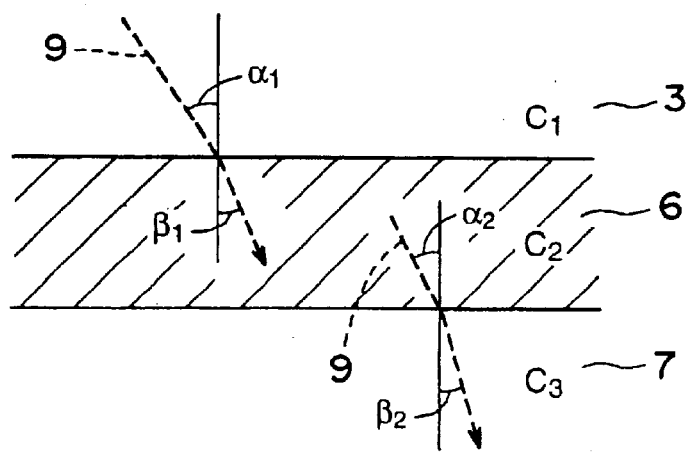
FIG. 10 explains the propagating routes of ultrasonic wave in the pipe wall at the outer surface and inner surface.

In FIG. 10, when a ultrasonic wave 9 is propagated from the ultrasonic propagating element in the wedge form 3 of the invention to the pipe wall 6, the relationship of the following equation (I) is produced on the outer surface of the pipe wall 6.

$$\sin \alpha_1 / \sin \beta_1 = C_1 / C_2 \quad (I)$$

In the equation (I), $C_1$ means a rate of sonic wave in the second ultrasonic propagating member 3, $C_2$ means a rate of sonic wave in the pipe wall 6, $\alpha_1$ means an angle of incidence (from the normal), and $\beta_1$ means an angle of refraction (from the normal).

When a ultrasonic wave 9 is propagated from the pipe wall 6 to the fluid 7 passing within the pipe, the relationship of the following equation (II) is produced on the inner surface of the pipe wall 6.

$$\sin \alpha_2 / \sin \beta_2 = C_2 / C_3 \quad (II)$$

In the equation (II), $C_2$ has the same meaning as above, $C_3$ means a rate of sonic wave in the passing fluid 7, $\alpha_2$ means an angle of incidence (from the normal), and $\beta_2$ means an angle of refraction (from the normal).

If the difference of rate of sonic wave between the second ultrasonic propagating member and the pipe wall is small, the angle of refraction ($\beta_2$) can be enlarged (almost up to the angle of incidence $\alpha_1$) by setting the angle of incidence $\alpha_1$ at a large value, and therefore the passage of the ultrasonic wave in the passing fluid can be prolonged. If the passage of the ultrasonic wave in the passing fluid is prolonged, a flow rate of a fluid passing in the pipe slowly can be measured with high sensitivity.

If the difference of rate of sonic wave between the second ultrasonic propagating member and the pipe wall is large, the ultrasonic may be totally reflected on the interface between the second propagating member and the pipe wall according to the Snell's Law, or the angle of refraction ($\beta_2$) is greatly reduced, as compared with the angle of incidence ($\alpha_1$). For instance, in the case of $C_1 < C_2$, the critical angle decreases, as the difference between $C_1$ and $C_2$ increases. Accordingly, if the angle of incidence ($\alpha_1$) is set at a large value, the ultrasonic wave may be totally reflected on the outer surface of the pipe wall. In the case of $C_1 > C_2$, the total reflection does not occur. However, the angle of refraction ($\beta_2$) decreases, as compared with the angle of incidence ($\alpha_1$), if the difference between $C_1$ and $C_2$ increases. The decrease of angle of refraction ($\beta_2$) results in decrease of passage of ultrasonic wave in the passing fluid. Therefore, if the difference of rate of sonic propagation between the second ultrasonic propagating member and the pipe wall is large, it is more difficult to design a flowmeter having high sensitivity, as compared with the case in that the difference of rate of sonic propagation between the second ultrasonic propagating member and the pipe wall is small.

Accordingly, the clamp-on ultrasonic flowmeter of the invention is more favorably employable for measuring a flow rate of a fluid passing in a pipe or tube whose wall is made of material having a rate of sonic wave propagation similar to that of the second ultrasonic propagating member of the invention. Preferred materials of the pipe wall are metal (such as iron, specifically stainless steel having a rate of sonic wave propagation of approx. 5,000 m/sec.), polyvinyl chloride resin having a rate of sonic wave propagation of approx. 2,200 m/sec., and fluororesin having a rate of sonic wave propagation of approx. 1,200 m/sec. The clamp-on ultrasonic flowmeter and the ultrasonic transmitting-receiving device are preferably employed in conjunction with a fluororesin pipe.

When a fluid passing within a pipe made of stainless steel is measured in its flow rate, the angle of the slanting surface to the bottom surface of the ultrasonic propagating element is preferably set to 5 to 25°, while a fluid passing within a pipe made of polyvinyl chloride is measured in its flow rate, the angle of the slanting surface to the bottom surface of the ultrasonic propagating element is preferably set to 25 to 45°.

In the above-mentioned explanation, the effect provided by the contact material is not mentioned, for the sake of simplifying the explanation. For the actually employed flowmeter, however, the design and arrangement of the ultrasonic transmitting-receiving devices are adjusted in consideration of the presence of the contact material. The adjustment and arrangement can be easily performed utilizing the Snell's Law.

The clamp-on ultrasonic flowmeter of the invention can be manufactured in the form of a combination of a pipe element having a joint at each end and the clamp-on ultrasonic flowmeter attached to the pipe element. The ultrasonic flowmeter of this structure can be placed in a pipe system in place of a detachable pipe element. This replacement system is favorably employed in the case that the pipe system contains a detachable pipe element.

The present invention is further described by the following examples.

COMPARISON EXAMPLE 1 —PRIOR ART

A commercially available clamp-on ultrasonic flowmeter (supplied by Tokyo Keiso Co., Ltd) was attached to a fluororesin pipe (outer diameter: 1 inch, made of polytetrafluoroethylene, PTFE) in the V-mode. The attachment of a pair of the ultrasonic transmitting-receiving devices onto the pipe surface was made using grease. In the pipe, water was passed. To the ultrasonic transducer of the ultrasonic transmitting-receiving device on the transmitter side was applied a voltage pulse (pulse width: 0.5 μsec., pulse height: 30 V). A ultrasonic wave transmitted by the device on the transmitter side was received by the ultrasonic transmitting-receiving device on the receiver side after propagating through the pipe wall portions and passing fluid.

Figure 7:
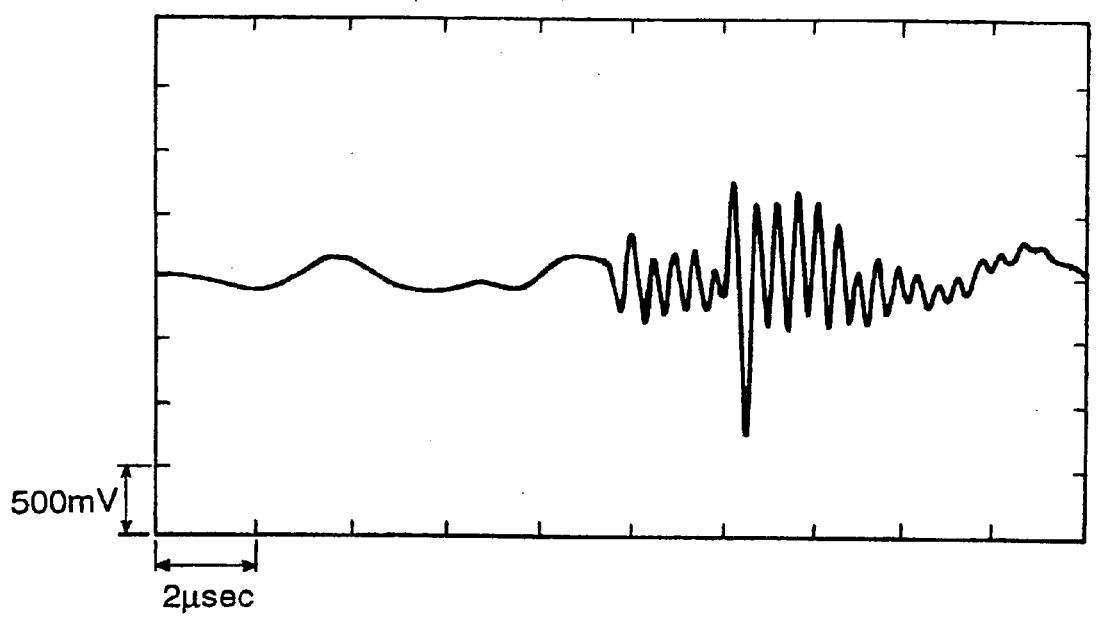
FIG. 7 indicates a waveform which is output from the ultrasonic receiving device in Comparison Example 1.

The waveform obtained in the receiver device is shown in FIG. 7. In FIG. 7, the time given is on the axis of abscissas, and the voltage is given on the axis of ordinates. The maximum amplitude of the voltage waveform obtained in the receiver device was 2.02 V.

EXAMPLE 1

A commercially available fiber-reinforced resinous material block (made of epoxy resin and carbon fibers having a tensile modulus in the longitudinal direction of 240 GPa) was cut to produce the first ultrasonic propagating member having the wedge form and plural planes on the bottom surface, which is illustrated in FIG. 2.

Independently, a two-pack polyurethane gel was placed on the bottom surface of the first ultrasonic propagating member and hardened at room temperature to give the ultrasonic propagating element illustrated in FIG. 2. The bottom surface of the hardened polyurethane gel was made to have a concave (or U-shaped) surface, so as to appropriately fix the elastomer sheet onto the surface of a pipe.

A commercially available ultrasonic transducer (diameter: 10 mm, thickness: 1 mm, made of lead zirconate titanate, PZT) was attached onto the slanting surface of the element.

Thus, a ultrasonic transmitting-receiving device having the constitution shown in FIG. 2 was produced.

The carbon fibers were aligned in parallel with the slanting surface, as is illustrated in FIG. 2. The angle of the slanting surface from the bottom surface was 60°.

The procedures of measurement of the flow rate of water passing within the pipe described in Comparison Example 1 were repeated using the pair of the ultrasonic transmitting-receiving devices produced above.

Figure 8:
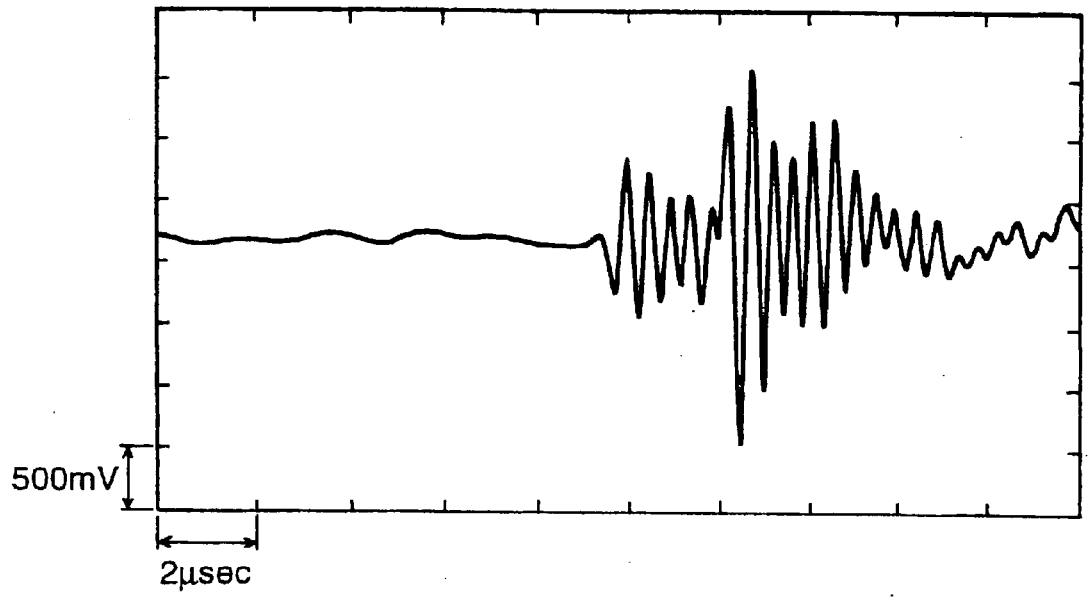
FIG. 8 indicates a waveform which is output from the ultrasonic receiving device in Example 1.
Figure 9:
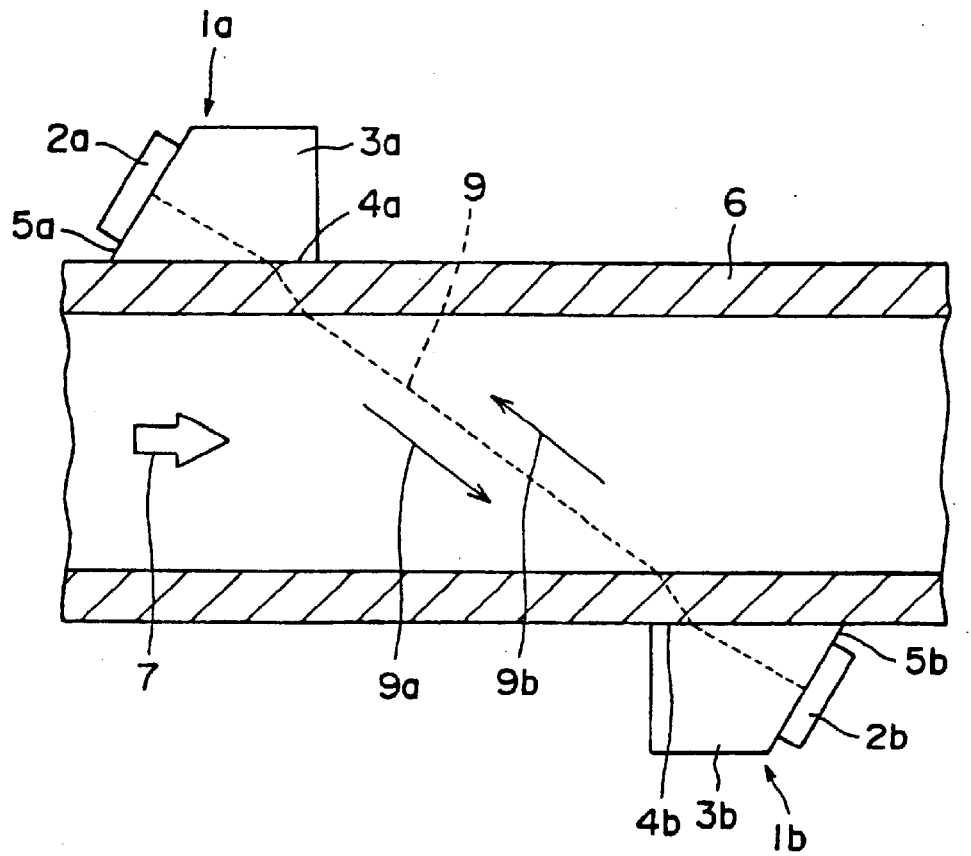
FIG. 9 shows a section of the conventional clamp-on ultrasonic flowmeter.

The waveform of the ultrasonic wave obtained in the transmitter device is shown in FIG. 8. In FIG. 8, the time given is on the axis of abscissas, and the voltage is given on the axis of ordinates. The maximum amplitude of the voltage waveform obtained in the receiver device was 2.94 V.

In summary, when the same voltage pulse was applied to the transducers of the ultrasonic transmitter devices of Comparison Example 1 and Example 1, the voltage collected from the ultrasonic transducer of the receiver device of the invention (Example 1) was more than 1.4 times as much as the voltage collected from the ultrasonic transducer of the prior art receiver device (Comparison Example 1). Accordingly, it is confirmed that the clamp-on ultrasonic flowmeter has prominently high sensitivity.

What is claimed is:

1. A clamp-on ultrasonic flowmeter comprising a pair of ultrasonic transmitting-receiving devices, each comprising a ultrasonic propagating element in the form of a wedge having a bottom surface and a slanting surface extending from one edge of the bottom surface at an acute angle, and a ultrasonic transducer attached on the slanting surface, wherein the ultrasonic propagating element comprises a first ultrasonic propagating member having on a bottom surface thereof a plurality of planes aligned in parallel with the slanting surface on which the ultrasonic transducer is attached, the first ultrasonic propagating member being composed of a plurality of sheet units in which each sheet unit is composed of plural high modulus fibers aligned in parallel in resinous material, and a second ultrasonic propagating member of elastic or plastic material, so as to propagate ultrasonic wave emitted by the ultrasonic transducer onto the bottom surface of the ultrasonic propagating element at an angle perpendicular to the slanting surface.

2. The clamp-on ultrasonic flowmeter of claim 1, wherein the sheet units of the first ultrasonic propagating member are produced under the condition that the high modulus fibers in one sheet unit are arranged to make a right angle with the high modulus fibers in an adjoining sheet unit.

3. The clamp-on ultrasonic flowmeter of claim 1, wherein the high modulus fiber has a tensile modulus of higher than 50 GPa.

4. The clamp-on ultrasonic flowmeter of claim 3, wherein the high modulus fiber is carbon fiber.

5. The clamp-on ultrasonic flowmeter of claim 1, wherein the second ultrasonic propagating member has a convex surface on the side not facing the first ultrasonic propagating member.

6. The clamp-on ultrasonic flowmeter of claim 1, wherein the second ultrasonic propagating member has a rate of sonic wave propagation in the range of 1,000 to 2,000 m/sec.

7. The clamp-on ultrasonic flowmeter of claim 1, wherein the second ultrasonic propagating member has a rate of sonic wave propagation higher than that of the first ultrasonic propagating member.

8. The clamp-on ultrasonic flowmeter of claim 1, wherein the second ultrasonic propagating member is made of polymeric gel.

9. The clamp-on ultrasonic flowmeter of claim 1, wherein a pair of the ultrasonic transmitting-receiving devices are linearly arranged in a long case having opening on a bottom thereof under the condition that the slanting surfaces on each of which the ultrasonic transducer is attached do not face each other.

10. The clamp-on ultrasonic flowmeter of claim 9, wherein the pair of the ultrasonic transmitting-receiving devices are arranged under the condition that each of the transmitting-receiving device is able to move on the opening to change a distance between the transmitting-receiving devices.

11. A flow rate-measuring structure comprising a pipe in which a fluid flows and a pair of ultrasonic transmitting-receiving devices arranged on the pipe on an outer surface thereof, each transmitting-receiving device comprising a ultrasonic propagating element in the form of a wedge having a bottom surface and a slanting surface extending from one edge of the bottom surface at an acute angle, and a ultrasonic transducer provided on the slanting surface, wherein the ultrasonic propagating element comprises a first ultrasonic propagating member having on a bottom surface thereof a plurality of planes aligned in parallel with the slanting surface on which the ultrasonic transducer is attached, the first ultrasonic propagating member being composed of a plurality of sheet units in which each sheet unit is composed of plural high modulus fibers aligned in parallel in resinous material, and a second ultrasonic propagating member of elastic or plastic material, so as to propagate ultrasonic wave emitted by the ultrasonic transducer onto the bottom surface of the ultrasonic propagating element at an angle perpendicular to the slanting surface.

12. The flow rate-measuring structure of claim 11, wherein the pipe is made of fluororesin.

13. The flow rate-measuring structure of claim 11, wherein the sheet units of the first ultrasonic propagating member are produced under the condition that the high modulus fibers in one sheet unit are arranged to make a right angle with the high modulus fibers in an adjoining sheet unit.

14. The flow rate-measuring structure of claim 11, wherein the high modulus fiber has a tensile modulus of higher than 50 GPa.

15. The flow rate-measuring structure of claim 14, wherein the high modulus fiber is carbon fiber.

16. The flow rate-measuring structure of claim 11, wherein the second ultrasonic propagating member has a convex surface on the side not facing the first ultrasonic propagating member.

17. The flow rate-measuring structure of claim 11, wherein the second ultrasonic propagating member has a rate of sonic wave propagation in the range of 1,000 to 2,000 m/sec.

18. The flow rate-measuring structure of claim 11, wherein the second ultrasonic propagating member has a rate of sonic wave propagation higher than that of the first ultrasonic propagating member.

19. The flow rate-measuring structure of claim 11, wherein the second ultrasonic propagating member is made of polymeric gel.

20. The flow rate-measuring structure of claim 11, wherein a pair of the ultrasonic transmitting-receiving devices are linearly arranged in a long case having opening on a bottom thereof under the condition that the slanting surfaces on each of which the ultrasonic transducer is attached do not face each other.

21. The flow rate-measuring structure of claim 20, wherein the sheet units of the ultrasonic propagating element are produced under the condition that the high modulus fibers in one sheet unit are arranged to make a right angle with the high modulus fibers in an adjoining sheet unit.

22. A ultrasonic transmitting-receiving device comprising a ultrasonic propagating element in the form of a wedge having a bottom surface and a slanting surface extending from one edge of the bottom surface at an acute angle, and a ultrasonic transducer attached on the slanting surface, wherein the ultrasonic propagating element comprises a first ultrasonic propagating member having on a bottom surface thereof a plurality of planes aligned in parallel with the slanting surface on which the ultrasonic transducer is attached, the first ultrasonic propagating member being composed of a plurality of sheet units in which each sheet unit is composed of plural high modulus fibers aligned in parallel in resinous material, and a second ultrasonic propagating member of elastic or plastic material, so as to propagate ultrasonic wave emitted by the ultrasonic transducer onto the bottom surface of the ultrasonic propagating element at an angle perpendicular to the slanting surface.

23. The ultrasonic transmitting-receiving device of claim 22, wherein the sheet units of the first ultrasonic propagating member are produced under the condition that the high modulus fibers in one sheet unit are arranged to make a right angle with the high modulus fibers in an adjoining sheet unit.

24. The ultrasonic transmitting-receiving device of claim 22, wherein the high modulus fiber has a tensile modulus of higher than 50 GPa.

25. The ultrasonic transmitting-receiving device of claim 24, wherein the high modulus fiber is carbon fiber.

26. The ultrasonic transmitting-receiving device of claim 22, wherein the second ultrasonic propagating member has a convex surface on the side not facing the first ultrasonic propagating member.

27. The ultrasonic transmitting-receiving device of claim 22, wherein the second ultrasonic propagating member has a rate of sonic wave propagation in the range of 1,000 to 2,000 m/sec.

28. The ultrasonic transmitting-receiving device of claim 22, wherein the second ultrasonic propagating member has a rate of sonic wave propagation higher than that of the first ultrasonic propagating member.

29. The ultrasonic transmitting-receiving device of claim 22, wherein the second ultrasonic propagating member is made of polymeric gel.

30. A ultrasonic transmitting-receiving device comprising a ultrasonic propagating element in the form of a wedge having a bottom surface and a slanting surface extending from one edge of the bottom surface at an acute angle, and a ultrasonic transducer attached on the slating surface, wherein the ultrasonic propagating element comprises a first ultrasonic propagating member having on a bottom surface thereof a plurality of planes aligned in parallel with the slanting surface on which the ultrasonic transducer is attached and a second ultrasonic propagating member of elastic or plastic material, the second ultrasonic propagating member having a rate of sonic wave propagation in the range of 1,000 to 2,000 m/sec so as to propagate ultrasonic wave emitted by the ultrasonic transducer onto the bottom surface of the ultrasonic propagating element at an angle perpendicular to the slanting surface.

31. A ultrasonic transmitting-receiving device comprising a ultrasonic propagating element in the form of a wedge having a bottom surface and a slanting surface extending from one edge of the bottom surface at an acute angle, and a ultrasonic transducer attached on the slanting surface, wherein the ultrasonic propagating element comprises a first ultrasonic propagating member having on a bottom surface thereof a plurality of planes aligned in parallel with the slanting surface on which the ultrasonic transducer is attached and a second ultrasonic propagating member of elastic or plastic material, the second ultrasonic propagating member having a rate of sonic wave propagation higher than that of the first ultrasonic propagating member, so as to propagate ultrasonic wave emitted by the ultrasonic transducer onto the bottom surface of the ultrasonic propagating element at an angle perpendicular to the slanting surface.

* * * * *